United States Patent
Uchiyama et al.

(10) Patent No.: US 6,246,493 B1
(45) Date of Patent: Jun. 12, 2001

(54) FACSIMILE APPARATUS

(75) Inventors: Masahiro Uchiyama, Samukawa-machi; Yasuhiro Hatano, Ebina, both of (JP)

(73) Assignee: Matsushita Graphics Communication Systems, Inc., Tokyo (JP)

( * ) Notice: Subject to any disclaimer, the term of this patent is extended or adjusted under 35 U.S.C. 154(b) by 0 days.

(21) Appl. No.: 09/129,429

(22) Filed: Aug. 5, 1998

(30) Foreign Application Priority Data

Nov. 14, 1997 (JP) .................................................. 9-331116

(51) Int. Cl.⁷ ........................................................ H04N 1/04
(52) U.S. Cl. ............................................ 358/498; 358/296
(58) Field of Search ................................ 358/498, 296, 358/471, 474, 400; 399/367; 271/3.14, 8.1

(56) References Cited

U.S. PATENT DOCUMENTS

| | | | |
|---|---|---|---|
| 5,559,609 | * 9/1996 | Yamada et al. | 358/400 |
| 5,651,623 | 7/1997 | Stodder et al. | 400/605 |
| 5,727,890 | * 3/1998 | Stodder et al. | 400/624 |
| 5,737,097 | * 4/1998 | Fujimoto | 358/476 |
| 5,896,206 | * 9/1999 | Kellogg | 358/498 |
| 5,954,326 | * 9/1999 | Gaarder et al. | 271/9.02 |

FOREIGN PATENT DOCUMENTS

| | | |
|---|---|---|
| 4108990 | 2/1994 | (DE) . |
| 5-254687 | 10/1993 | (JP) . |
| 6-125433 | 5/1994 | (JP) . |
| 7-20756 | 4/1995 | (JP) . |
| 7-330182 | 12/1995 | (JP) . |

OTHER PUBLICATIONS

English Language Abstract of JP 5–254687, Oct. 5, 1993.
English Language Abstract of JP 7–330182, Dec. 19, 1995.

* cited by examiner

Primary Examiner—Cheukfan Lee
(74) Attorney, Agent, or Firm—Greenblum & Berstein, P.L.C.

(57) ABSTRACT

A facsimile machine includes a main body having a facsimile unit. A document roller that feeds a document is provided in the main body. A sheet feed roller that feeds a recording paper is also provided in the main body. The document roller and the sheet feed roller have a substantially identical shape and are made of a substantially identical material. The document roller and the sheet feed roller have a first side surface and a second side surface opposite to the first side surface. The first side surface has a hole configured to be engaged with a shaft that transmits a drive force and the second side surface has an engaging piece configured to be engaged with a one-way clutch.

12 Claims, 4 Drawing Sheets

FACSIMILE APPARATUS

BACKGROUND OF THE INVENTION

1. Field of the Invention

The present invention relates to a personal facsimile machine mainly for the domestic use.

2. Description of the Related Art

In conventional personal facsimile machines of a thermal recording system, ordinary paper is used for scanning a document and a roll-typed thermal paper is used as recording paper. In order to adjust to paper materials to be used, the kinds of rollers used in transferring the document and those used in transferring the recording paper are formed of different materials.

On the other hand, in large-sized facsimile machines of a laser recording system, there is used ordinary paper in both cases of scanning and recording operations. However, since the specifications required in the scanning operation and the recording operation are largely different, the kinds of rollers used in transferring the document and those used in transferring the recording paper are formed of parts of different shapes.

In contrast to the above machines, personal facsimile machines, which perform a thermal recording using ordinary paper, have recently been brought to the commercial stage. Such personal facsimile machines use ordinary paper in both cases of the scanning and recording operations. There is little difference in the specifications required in the scanning operation and the recording operation.

In this type of the facsimile machines, similar to the conventional facsimile machines, the kinds of rollers used in transferring the document and those used in transferring the recording paper are formed of parts of different shapes and materials. This causes a bottleneck in reducing the manufacturing cost.

SUMMARY OF THE INVENTION

An object of the present invention is to reduce kinds of roller parts used in a personal facsimile machine, which performs recording on ordinary paper.

According to the present invention, a roller used in transferring recording paper and a roller used in transferring a document are formed of the same shape, material, and the same rotational directions, thereby attaining the above object.

DETAILED DESCRIPTION OF THE PREFERRED EMBODIMENT

An embodiment of the present invention will now be specifically described with reference to the accompanying drawings.

Figure 1:
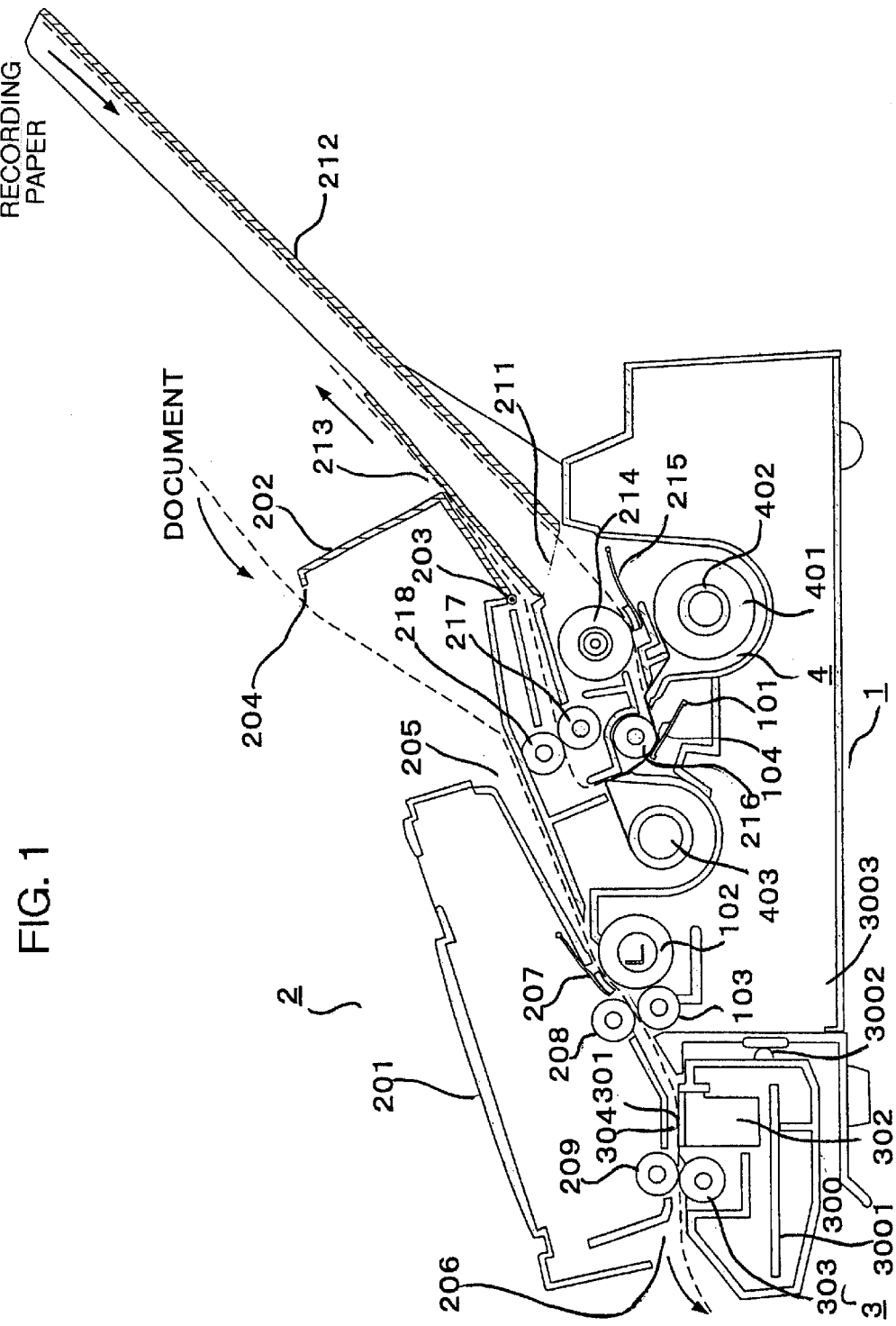
FIG. 1 is a diagrammatic cross-sectional view of a facsimile machine in one embodiment of the present invention.

FIG. 1 is a diagrammatic cross-sectional view showing a facsimile machine in one embodiment of the present invention. In the explanation herein below, a left side of FIG. 1 is a front surface where user is present, and a right side is a rear surface.

As shown in FIG. 1, the facsimile machine of the present invention comprises a main body 1, a control panel 2, and a scanner 3. The control panel 2 is secured to an upper portion of the main body 1 by a rotation shaft. The scanner 3, which is detachably attached to a front portion of the main body such that a surface (hereinafter referred to as scanning surface) contacting a document is directed upward when a scanning unit 31 performs a scanning operation, carries out a document scanning operation. The scanner 3 can be used as being detached from the main body 1.

An ink film unit 4, which is coated with heat sublimation ink for a transfer to recording paper, is set in the main body 1. The ink film unit 4 comprises a pay-off reel 402 and a take-up reel 403. The pay-off reel 402 is wound around the ink film 401, having a base material coated with heat sublimation ink, and the take-up reel 403 winds the ink film in accordance with a recording paper transfer operation. The ink film unit 4 is set at a backward upper portion of the main body 1 such that the pay-off reel 402 is positioned at the rear surface of the main body 1. Then, the take-up reel 403 is rotated in an anticlockwise direction of FIG. 1 in accordance with a recording paper transfer operation so as to wind the ink film 401 sequentially.

The main body 1 has a frame structure, and a part thereof serves as a guide for a document to be sent at a document scanning operation time. In the frame structure, a recording head 101, an auto document feed roller (hereinafter referred to as ADF roller) 102, a document feed roller 103, and a power source unit and a control board, which are not shown, etc., are contained.

The recording head 101 is attached between the pay-off reel 402 of the ink film unit 4 and the take-up reel 403. At the time of the recording paper transfer operation, the recording head 101 heats and sublimates ink of the ink film 401 so as to transfer ink to a recording paper supplied to a recording position 104.

The ADF roller 102 is positioned at a forward upper portion of the main body 1, and rotates in an anticlockwise direction of FIG. 1 at the document scanning operation time so as to feed the document to the scanner 3. The document is carried on an upper side of the ADF roller 102.

The document feed roller 103 is positioned at a front portion of the ADF roller 102, and rotates in the anticlockwise direction of FIG. 1 so as to carry the fed document to the scanner 3.

The control panel 2 has a frame structure, and a part thereof serves as a guide for a recording paper to be carried at the recording paper transfer time and as a guide for a document to be carried at the document scanning operation time.

Various kinds of operation buttons 201 are arranged on an upper surface of the operation panel 2. The user depresses the operation buttons 201, so that the facsimile machine can execute various kinds of operations.

A document tray 202 for setting a document is provided at a backward upper portion of the control panel 2. The document tray is attached to be rotatable around a hinge 203. Then, when the document tray 202 is opened, the document can be set and received at a top portion 204 of the document tray 202. On the other hand, when the document tray 202 is closed, a dust-proof effect to a document insertion port 205 can be brought about.

A portion between the control panel 2 and the scanner 3 serves as a document discharge port 206 for discharging a read document.

In the front portion of the control panel 2, a document separation pad 207, a document pinch roller 208, and a document discharge roller 209 are mainly contained.

The document separation pad 207 is provided at a position opposite to the ADF roller 102. The document separation pad 207 separates one document to be scanned from a plurality of documents set in the document tray 202 to be in contact with the ADF roller 102.

The document pinch roller 208 is provided at a position opposite to the document feed roller 103. The document pinch roller 208 applies tension onto the document in order to transfer the document to the scanner 3 smoothly.

The document discharge roller 209 is provided at a position opposite to an encoder roller 103. The document discharge roller 209 rotates in a clockwise direction of FIG. 1 and discharges the scanned document from the document discharge port 206.

A recording paper insertion port 211 is provided at a backward lower stage of the control panel 2. A paper-feed tray 212 is inserted thereto, and the recording paper can be set. A recording paper discharge port 213 is provided at a backward middle stage of the control panel 2 so as to discharge a transferred recording paper.

In the back portion of the control panel 2, an auto sheet feed roller (hereinafter referred to as ASF roller) 214, a recording paper separation pad 215, a recording roller 216, a recording paper discharge roller 217, a recording paper pinch roller 218 are mainly contained.

The ASF roller 214 is positioned at an upper portion of the pay-off reel 402 of the ink film unit 4, and rotates in a clockwise direction of FIG. 1 at a recording paper transfer operation time so as to feed recording paper to the recording position 104. The recording paper is carried on the lower side of the ASF roller 214.

The recording paper separation pad 215 is provided at a position opposite to the ASF roller 214. The recording paper separation pad 215 separates one paper to be transferred from a plurality of recording paper set in the tray 212 to be in contact with the ASF roller 214.

The recording roller 216 is provided at a position opposite to the recording head 101. The recording roller 216 sandwiches the ink film 401 between the recording head 101 and the recording roller 216. Then, the recording roller 216 rotates in a clockwise direction of FIG. 1 at the recording paper transfer operation time, and inserts the recording paper between the ink film 401 and the recording roller 216. Then, the recording roller 216 applies tension to recording paper and the ink film 402 in order to execute a smooth thermal transfer at the recording position 104.

The recording paper discharge roller 217 rotates in a clockwise direction of FIG. 1, and discharges the transferred recording paper from the recording paper discharge port 213.

The recording pinch roller 218 is provided at a position opposite to the recording paper discharge roller 217. The recording pinch roller 218 applies tension to the transferred recording paper in order to carry the transferred recording paper to the recording paper discharge port 213 smoothly.

A scanning surface back portion of the scanner 3 is covered with a protection glass 301, and has a scanning unit 302. The scanning unit 302 is structured such that the document is lightened by an LDE light source (not shown) and a document image is formed in an image sensor (not shown) through a lens optical system.

An encoder roller 303 is attached to a scanning surface front portion of the scanner 3. The encoder roller 303 includes a slit wheel (not shown), an optical system, and a controller so as to form an encoder.

The above-explained rollers comprises a cylindrical roller base, which is made of material such as polyacetal, polyamide resin, and a belt-like high friction section, which is made of material such as synthetic rubber having high coefficient of friction and which is wound around an outer periphery of the roller base.

Figure 2:
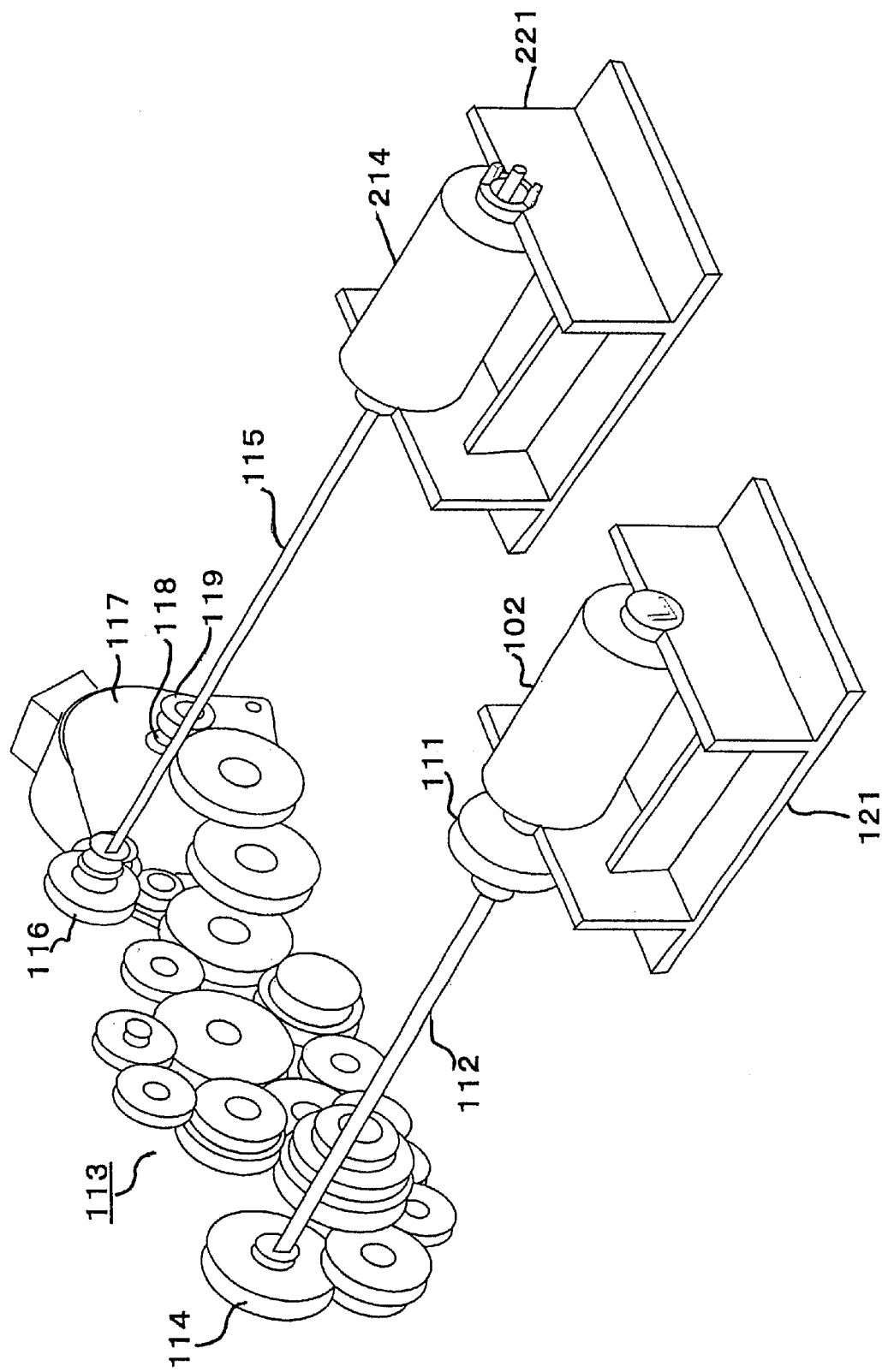
FIG. 2 is a partially perspective view of the facsimile machine in one embodiment of the present invention.

Next, the attachment and drive of the ADF roller 102 and the ASF roller 214 will be specifically described with reference to FIGS.2 to 5. FIG.2 is a partially perspective view of a paper feeding portion of the facsimile machine of this embodiment.

As shown in FIG. 2, the ADF roller 202 and ASF roller 214 are supported on bearing sections 121, 221, which are provided in the frame, to be rotatable in only an axial direction, respectively.

The ADF roller 102 is coupled to a one-way clutch 111, a transmission shaft 112, and a gear 114 of a gear train 113. The ASF roller 214 is coupled to a transmission shaft 115, and a gear 116 of the gear train 113.

The gear train 113 is engaged with a gear 119 attached to an output shaft 118 of a drive motor 117 provided to an inner side of the side surface of the main body 1. A drive force of the drive motor 117 is transmitted to the ADF roller 102 via the gear train 113, the transmission shaft 112, and the one-way clutch 111 at the time of the document scanning operation and copying operation. And a drive force of the drive motor 117 is transmitted to the ASF roller 214 gear train 113 and the transmission shaft 115.

Figures 3A, 3B, 3C:
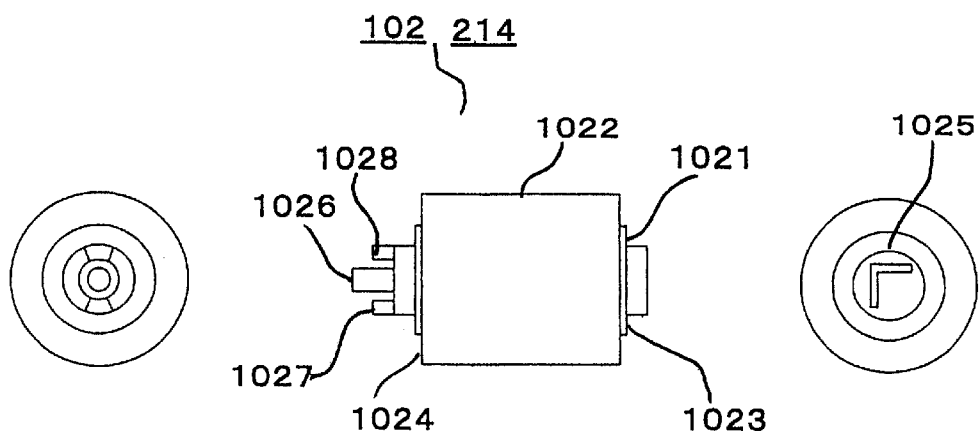
FIGS. 3A, 3B, and 3C are front, left side, and right side views, respectively, showing an ADF roller and an ASF roller of the facsimile machine in one embodiment of the present invention.

FIG. 3 is a plan view of the ADF roller 102 and the ASF roller 214 of the facsimile machine in this embodiment. FIG. 3A is a front view, FIG. 3B is a left side view, and a FIG. 3C is a right side view.

As shown in FIG. 3, the ADF roller 102 and the ASF roller 214 comprise a multi-cylindrical roller base 1021, and a belt-like high friction portion 1022 wound around the roller base, respectively.

Cylindrical convex portions 1023, 1024 having the same diameter are formed on both sides of the roller base 1021. On an end surface of the convex portion 1023, there is formed an L-shaped hole 1025 whose size is such that the transmission shaft 115 can be inserted thereto.

The insertion of the transmission shaft 115 to the L-shaped hole 1025 allows the drive force of the drive motor 117 to be transmitted to the ASF roller 214 via the inserted transmission shaft 115.

A cylindrical central shaft 1026, which is thinner than the diameter of the convex portion 1024 and which projects from the convex portion 1024, is formed at the center of the convex portion 1024 of the roller base 1021. A pair of engaging pieces 1027 and 1028 is formed at the position opposite to each other to sandwich the central shaft 1026 of the convex portion 1024 therebetween.

The engagement of the engaging pieces 1027 and 1028 of the convex portion 1024 with the one-way clutch 111 allows the drive force of the drive motor 117 to be transmitted to the ADF roller 102 via the one-way clutch 111.

In other words, the ADF roller 102 and the ASF roller 214 are provided in the direction opposite to each other, and the drive force is transmitted from the different side surface. The transmission of the drive force from the different side surface allows a designer to enhance degree of freedom of the design such as a shape in attaching the one-way clutch.

Figures 4A, 4B, 4C:
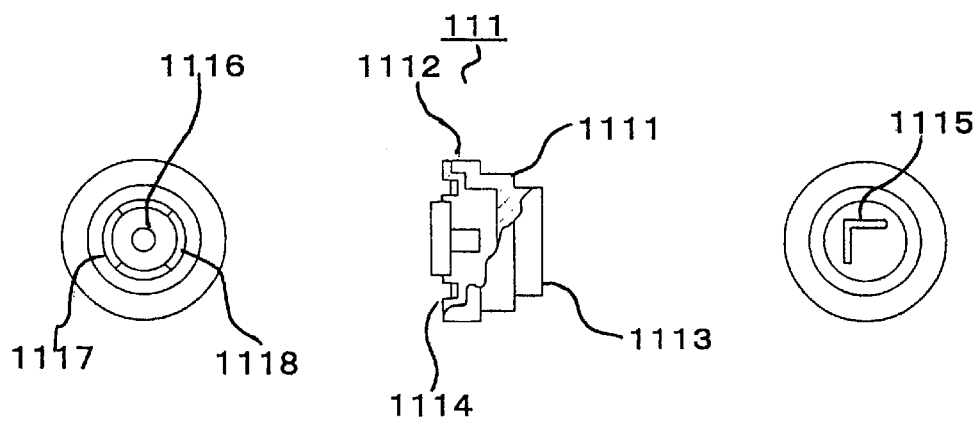
FIGS. 4A, 4B, and 4C are front, left side, and right side views, respectively, of a one-way clutch of the facsimile machine in one embodiment of the present invention.

FIG. 4 is a plan view of the one-way clutch 111 of the facsimile machine in this embodiment. FIG. 4A is a front view, 4B is a left side view, and 4C is a right side view.

The one-way clutch 111 comprises a multi-cylindrical clutch body 1111 and a rotor 1112 attached to the clutch body 1111 to be rotatable in only one axial direction. On a side surface 1113 of the clutch body 1111, there is formed an L-shaped hole 1115, which is the same as the end surface of the convex portion 1023 of the ADF roller 102.

A hole 1116 is formed at the center of the side surface portion of the rotor 1112. The hole 1116 has a diameter, which is larger than the central shaft 1026 of the convex portion 1024 of the ADF roller 102, and a depth, which is larger than the length of which the central shaft 1026 projects from the convex portion 1024. Also, a pair of engaging pieces 1117, 1118 is formed at the position opposite to each other to sandwich the hole 1116 therebetween. Each of the engaging pieces 1117 and 1118 has an outer diameter, which is the same as each of engaging pieces 1027 and 1028, and a length of an outer arc, which is shorter than a distance between the engaging pieces 1027 and 1028.

The engagement of the engaging pieces 1027, 1028 of the ADF roller 102 with the engaging pieces 1117, 1118 of the one-way clutch 111 allows the drive force of the drive motor 117 to be transmitted to the ADF roller 102 via the one-way clutch 111. Also, the insertion of the central shaft 1026 of the ADF roller 102 to the hole 1116 of the one-way clutch 111 can restrain shake caused by the one-way clutch 111 and the ADF roller 102.

Thus, the transmission of the drive force of the drive motor via the one-way clutch facilitates the maintenance of the machine.

Figures 5A, 5B, 5C:
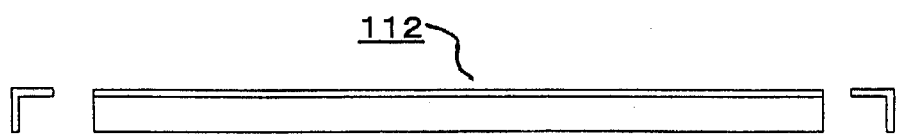
FIGS. 5A, 5B, and 5C are front, left side, and right side views, respectively, of a transmission shaft of the facsimile machine in one embodiment of the present invention.

FIG. 5 is a plan view of the transmission shafts 112 and 115 of the facsimile machine in this embodiment. FIG. 5A is a front view, FIG. 5B is a left side view, and FIG. 5C is a right side view.

The transmission shafts 112 and 115 are the same parts, and have L-shaped cross-sections, as shown in FIG. 5. The transmission shafts 112 and 115 are inserted to the L-shaped hole 1115 of the side surface 1113 of the one-way clutch 111 or the L-shaped hole 1025 of the convex portion 1023 of the ASF roller 214. Thereby, the transmission shafts 112 and 115 are firmly coupled to the one-way clutch 111 or the ASF roller 214.

Similarly, the transmission shafts 112 and 115 are inserted to L-shaped holes, which are formed on the side surfaces of the gears 114 and 116 shown in FIG. 2. Thereby, the transmission shafts 112 and 115 are firmly coupled to the gears 114 and 116.

Thus, the shafts for transmitting the drive force to the ADF roller 102 and the ASF roller 214 are formed to have the same shape, so that the reduction in the kinds of parts can be further improved.

There is a case in which the surfaces of the high friction portions 1022 of the ADF roller 102 and the ASF roller 214 are subjected to roughing process in order to obtain high coefficient of friction to restrain a slid of paper. In this case, the high coefficient of friction may be obtained in only one rotational direction.

Figure 6:
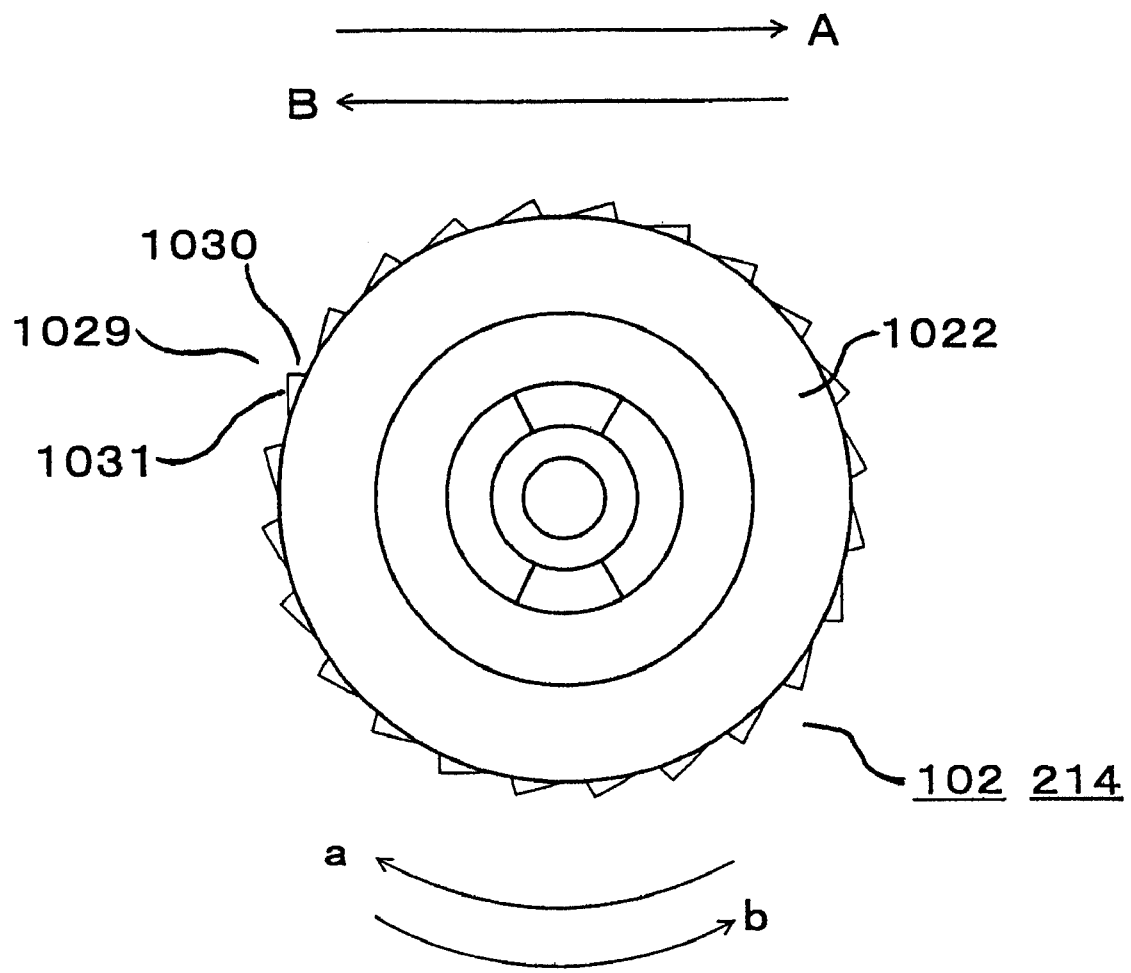
FIG. 6 is an enlarged left side view of the AFD roller and the ASF roller.

FIG. 6 is an enlarged left side view of the ADF roller 102 and the ASF roller 214 when the surfaces of the high friction portions 1022 are subjected to roughing process.

As shown in FIG. 6, when the surfaces of the high friction portions 1022 are subjected to roughing process, innumerable projections 1029 are generated on the surfaces of the high friction portions 1022. The tilt of an inclined surface 1030 of the projection 1029 is sharper than that of an inclination surface 1030. Therefore, as compared with the rotation in a direction B where paper is carried in a direction b, the rotation in a direction A where paper is carried in a direction a increases the coefficient of friction between the rollers and paper, and an amount of paper slides decreases. The rotational direction where the coefficient of friction between the rollers and paper is high is hereinafter referred to as forward rotating direction.

In FIG. 1, the ADF roller rotates in the anticlockwise direction, and the ASF roller 214 rotates in the clockwise direction. The surface of the ASF roller 214 where the drive force is transmitted is opposite to the surface of the ADF roller 102, and then the ASF roller 214 rotates in an opposite direction with respect to the ADF roller 102. In the other words, if the rotating direction of the ADF roller 102 is the forward rotating direction, the rotating direction of the ASF roller 214 is also the forward rotating direction.

Thus, in the case in which the surfaces of the high friction portions 1022 are subjected to roughing process in order to have directivity, the ADF roller 102 and the ASF roller 214 having the same shape and material can be used.

Next, the following will explain the document scanning operation in the facsimile machine of the present invention. In addition, as a preparation of the document scanning, a document tray 202 is opened, a document is inserted in a document insertion port 205 so that the document contacts with the ADF roller 102.

First, when the user depresses the operation button 201 or gives an instruction of starting to scan the document, the drive motor 117 rotates. The drive force is transmitted to the ADF roller 102 via the gear train 113, the transmission shaft 112, so that the ADF roller 102 rotates in the anticlockwise direction of FIG. 1, that is, the forward rotating direction. One of the documents set in the document tray 202 is separated from the other documents by the document separation pad 207. The document is passed via the upper side of the ADF roller 102 by a friction force of the high friction portion 1022 of the ADF roller 102, and is carried from the right of FIG. 1 to the left.

The document carried by the ADF roller 102 passes between the document feed roller 103 and the document pinch roller 208, and reaches a scanning point 304 of the scanning unit 302 of the scanner 3. Then, the document is scanned by an image sensor (not shown) through the optical system of the scanning unit 302 as being carried by the document feed roller 103 and the document pinch roller 208, and the document discharge roller 209 and the encoder roller 303. At this time, the number of rotations of a slit wheel (not shown), which is coupled to the encoder roller 303, is counted so as to detect an amount of shift of the document.

The scanned document passes between the document discharge roller 209 and the encoder roller 303, and is discharged from the document discharge port 206.

Next, the following will explain the recording paper transfer operation in the facsimile machine of the present invention.

As a preparation for the recording paper transfer, the ink film unit 4 is set in the main body 1 in advance. Also, the tray 212 for the recording paper is set at the insertion port 211 for the recording paper, and the recording paper is inserted to the insertion port 211 to come in contact with the ASF roller 214.

First, when a data signal is received in a receiver (not shown) or the user depresses the operation button, the drive motor 117 rotates. Then, the drive force of the drive motor 117 is transmitted to the ASF roller 214 via the gear train 113 and the transmission shaft 115, so that the ASF roller 214 rotates in the clockwise direction of FIG. 1, that is, the forward rotating direction.

Then, a sheet of recording paper set in the tray 212 is separated from the other recording paper by the recording paper separation pad 215. The recording paper is passed through the lower side of the ASF roller 214 by the friction force of the high friction portion 1022 of the ASF roller 214, and is carried from the right of FIG. 1 to the left.

The recording paper carried by the ASF roller 214 reaches the recording position 104, which is sandwiched between the recording roller 216 and the ink film 401. The recording paper is further carried while tension is applied thereto by the recording roller 216. At the same time, the take-up reel 403 of the ink film unit 4 rotates in synchronous with carrying the recording paper. Then, an image data stored in a memory on a substrate (not shown) is transferred to the recording paper by the recording head 101.

The recording paper to which image data is transferred is carried upward by the recording roller 216, and is further carried backward by the guide of the frame of the control panel 2. Then, the recording paper passes between the recording paper discharge roller 217 and the document pinch roller 218, and is discharged from the recording paper discharge port 213.

The facsimile machine of the above embodiment was explained using the thermal recording as a recording system. However, the present invention is not limited to the above embodiment. The present invention can obtain the same effect as the above embodiment even if the other recording system is used.

According to the present invention, the ADF roller and the ASF roller, which are used in the personal facsimile machine using ordinary paper as recording paper, can be formed of the same shape and material, which allows to reduce the kinds of parts.

What is claimed is:

1. A facsimile machine comprising:
   a main body having a facsimile unit;
   a document roller that is provided in the main body and that feeds a document;
   a sheet feed roller that is provided in the main body and that feeds a recording paper;
   wherein the document roller and the sheet feed roller have an identical shape and are of identical material, each of the document roller and the sheet feed roller having a first side surface and a second side surface opposite to the first side surface, the first side surface having a hole configured to be engaged with a shaft that transmits a drive force, the second side surface having an engaging piece configured to be engaged with a one-way clutch.

2. The facsimile apparatus according to claim 1, wherein a cross section of the shaft is L-shaped, and the hole is L-shaped, the L-shaped shaft being directly engaged with the L-shaped hole.

3. The facsimile machine according to claim 1, wherein the one-way clutch has a first side surface and a second side surface, the first side surface of the one-way clutch having a shape configured to be coupled to the engaging piece provided on the second side surface of one of the document roller and the sheet feed roller, the second side surface of the one-way clutch having a hole configured to be engaged with the shaft, so that identical shafts are usable to couple the first side surface of the one of the document roller and the sheet feed roller and the second side surface of the one-way clutch.

4. The facsimile machine according to claim 1, wherein a surface of each roller has a first friction coefficient in a first rotational direction and a second friction coefficient lower than the first friction in a second rotational direction, the second rotational direction being opposite to the first rotational direction.

5. The facsimile machine according to claim 3, wherein a cross section of the shaft is L-shaped, the hole of the first side surface of each of the document roller and the sheet feed roller and the hole of the second side surface of the one-way clutch is L-shaped so that the L-shaped shaft can be engaged with the L-shaped hole.

6. The facsimile machine according to claim 1, wherein
   the document roller and the sheet feed roller rotate in opposite directions,
   a document is moved via an upper side of the document roller,
   a recording paper is moved via an lower side of the document roller,
   a peripheral surface of each of the document roller and the sheet feed roller has a friction coefficient in a moving direction of one of the document and the recording paper that is higher than a friction coefficient in a direction opposite to the moving direction of one of the document and the recording paper.

7. A facsimile apparatus comprising:
   a main body having a facsimile unit;
   a sheet roller having a first side surface and a second side surface, the first side surface including a hole directly engaged with a shaft that transmits a drive force to drive the sheet roller, the second side surface including an engaging piece configured to be engaged with a one-way clutch;
   a document roller having an identical shape and being of an identical material as the sheet roller, the document roller having a first side surface and a second side surface, the first side surfaces of the document roller and the sheet feed roller facing in opposite directions, the one-way clutch being engaged with an engaging piece of the document roller to drive the document roller; and
   a drive device that drives the shaft and the one-way clutch in opposite directions.

8. The apparatus according to claim 7, wherein a document is moved via an upper side of the document roller, and a recording paper is moved via a lower side of the sheet roller.

9. A facsimile machine comprising:
   a paper feeding mechanism having two identical rollers serving as a document roller that feeds a document and a sheet roller that feeds a recording paper, respectively;
   a bearing section that supports each of the rollers at one end;
   a first shaft directly connected to one of the rollers and a second shaft indirectly connected to another one of the rollers, the first and second shafts transmitting a drive force to the rollers;

each of the two rollers having a first side surface configured to be directly engaged with the first shaft and a second side surface configured to be engaged with a clutch;

wherein one of the rollers is indirectly connected to the second shaft via the clutch that is coupled to the one of the rollers at the second side surface and is supported by the bearing section at the first side surface, and wherein the other one of the rollers is coupled to the first shaft at the first side surface and is supported by the bearing section at the second side surface.

10. The facsimile machine according to claim 9, each of the rollers being interchangeably used as the sheet roller and as the document roller.

11. A sheet feeding apparatus comprising:

a main body having two substantially similar rollers, a first roller that feeds a document and a second roller that feeds at least a recording sheet;

a section that supports one end of each of said rollers;

a first shaft directly connectable to one of the rollers and a second shaft indirectly connectable to another one of the rollers, the first and second shafts transmitting a drive force to the first and second rollers;

each of the two rollers having a first side surface configured to be directly engaged with the first shaft and a second side surface configured to be engaged with a clutch;

wherein said one of the rollers is indirectly connected to the second shaft through the clutch that is coupled to the one of the rollers at the second side surface and is supported by the section at the first side surface and the other one of the rollers is directly connected to the first shaft at the first side surface and is supported by the section at the second side surface.

12. A medium feeding mechanism for use in a medium feeding apparatus, the medium feeding mechanism comprising:

a first roller that feeds a first medium;

a second roller that feeds a second medium;

the second roller having a substantially similar shape and being of a substantially similar material as the first roller;

a section that supports one end of each of the rollers;

a first shaft directly connected to one of the rollers and a second shaft indirectly connected to another one of the rollers, the first and second shafts transmitting a drive force to the first and second rollers;

each of the two rollers having a first side being configured to be directly engaged with the first shaft and a second side surface configured to be engaged with a clutch;

wherein the first roller is indirectly connected to the second shaft through the clutch that is coupled to the first roller at the second side surface and supported by the section at the first side surface and the second roller is directly connected to the first shaft at the first side surface and is supported by the section at the second side surface.

* * * * *